United States Patent
Isobe et al.

(10) Patent No.: US 7,907,584 B2
(45) Date of Patent: Mar. 15, 2011

(54) ACCESS ROUTER DEVICE, MOBILITY CONTROL SYSTEM, AND MOBILITY CONTROL METHOD

(75) Inventors: Shin-ichi Isobe, Yokosuka (JP);
Katsutoshi Nishida, Yokohama (JP);
Naoki Matsubara, Yokosuka (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 663 days.

(21) Appl. No.: 11/913,500

(22) PCT Filed: May 16, 2006

(86) PCT No.: PCT/JP2006/309745
§ 371 (c)(1),
(2), (4) Date: Nov. 2, 2007

(87) PCT Pub. No.: WO2006/123657
PCT Pub. Date: Nov. 23, 2006

(65) Prior Publication Data
US 2009/0046679 A1    Feb. 19, 2009

(30) Foreign Application Priority Data
May 16, 2005   (JP) ................................ 2005-142594

(51) Int. Cl.
*H04W 8/02*   (2009.01)
(52) U.S. Cl. .......................... 370/338; 370/331; 455/436
(58) Field of Classification Search .................. 370/331, 370/338
See application file for complete search history.

(56) References Cited

U.S. PATENT DOCUMENTS

| | | | | |
|---|---|---|---|---|
| 6,654,359 B1 * | 11/2003 | La Porta et al. | ............... | 370/328 |
| 2001/0046223 A1 * | 11/2001 | Malki et al. | .................... | 370/338 |
| 2003/0225892 A1 | 12/2003 | Takusagawa et al. | | |
| 2004/0004967 A1 | 1/2004 | Nakatsugawa et al. | | |
| 2004/0240393 A1 * | 12/2004 | Nishida et al. | ................ | 370/253 |
| 2005/0176432 A1 | 8/2005 | Kamura et al. | | |

(Continued)

FOREIGN PATENT DOCUMENTS

JP    2000-183972 A    6/2000

(Continued)

OTHER PUBLICATIONS

Corresponding International Search Report dated Aug. 29, 2006 (Form PCT/ISA/210), along with Form PCT/ISA/237 (Six (6) pages).

(Continued)

*Primary Examiner* — Ricky Ngo
*Assistant Examiner* — Rasheed Gidado
(74) *Attorney, Agent, or Firm* — Crowell & Moring LLP

(57) ABSTRACT

In a network configuration in which a mobility control node is placed in the network, a packet is forwarded from a communication partner to the mobility control node by a basic IP mobility protocol for supporting movement in a local network managed by the mobility control node, a movement of a mobile terminal device across local networks formed by mobility control nodes is achieved without adding a function to the mobile terminal device. A mobility control node to be provided to the mobile terminal device is identified by a trigger reporting a movement has been performed to the network from the mobile terminal device, and, in the case of HO across between mobility control nodes, network information before the movement is reported instead of network information to be originally reported. Thus, the mobile terminal device determines that the movement is in the same network and can continue communication without performing an address generation procedure.

7 Claims, 9 Drawing Sheets

U.S. PATENT DOCUMENTS

2006/0018291 A1 * 1/2006 Patel et al. .................. 370/335

FOREIGN PATENT DOCUMENTS

| JP | 2003-60684 A | 2/2003 |
| JP | 2004-15143 A | 1/2004 |
| JP | 2004-40581 | 2/2004 |
| JP | 2004-120194 A | 4/2004 |
| JP | 2005-64646 A | 3/2005 |
| WO | WO 2004/057903 A1 | 7/2004 |

OTHER PUBLICATIONS

H. Soliman et al., "Hierarchical Mobile IPv6 Mobility Management (HMIPv6)", Network Working Group, Aug. 2005, pp. 1-29, The Internet Society (2005).

D. Johnson et al., "Mobility Support in IPv6", Network Working Group, Jun. 2004, pp. 1-86, The Internet Society (2004).

Form PCT/IB/338, Form PCT/IB/373, and Form PCT/ISA/237 (Six (6) Pages).

* cited by examiner

ACCESS ROUTER DEVICE, MOBILITY CONTROL SYSTEM, AND MOBILITY CONTROL METHOD

TECHNICAL FIELD

The present invention relates to an access router device, a mobility control system, and a mobility control method, and particularly to an access router device, a mobility control system, and a mobility control method that are used in a network configured in a way that a mobility control node is placed in the network, a packet is forwarded from a communication partner to the mobility control node by a basic IP mobility protocol for supporting movement in a local network managed by the mobility control node.

BACKGROUND ART

As a technique for supporting mobility in an IP network, Mobile IPv6 (MIP) has been proposed by IETF (Internet Engineering Task Force) (see Non-Patent Document 1). MIP allows a communication to continue even if a mobile terminal device moves by placing a mobility control node called Home Agent in a network and managing a position of the mobile terminal device in this node. As a technique for improving performance of handover (hereinafter abbreviated as HO), Hierarchical Mobile IPv6 (HMIP) has been proposed (see Non-Patent Document 2). In HMIP, a Mobility Anchor Point (hereinafter abbreviated as MAP) is newly defined as a mobility control node in a network and a position of a mobile terminal device in a local area is managed, so that disruption time by HO is reduced.

FIG. 9 is a diagram which shows an operation example of HMIP. In the figure, according to HMIP, MAP information of a network in which a mobile terminal device is currently located is managed in a Home Agent (hereinafter abbreviated as HA) 40. An MAP 30 manages a mobile terminal identifier assigned by an access router (hereinafter abbreviated as AR) to which a mobile terminal device 10 currently connects. Thereby, a packet sent from a communication partner (Correspondent Node; hereinafter abbreviated as CN) 50 is passed sequentially through the HA 40, the MAP 30, and the AR 21 to which the mobile device connects and finally forwarded to the mobile terminal device.

In HMIP, the mobile terminal device 10 has acquired information of the MAP 30 in advance, and, if an HO from the AR 21 to an AR 22 is performed (step S51), then a mobile terminal identifier assigned by the currently connected AR 22 is notified to the MAP 30 (step S52). Route switching is thereby performed (step S53). From then on, when the MAP 30 receives a packet from the CN 50, the MAP 30 can transfer the packet to the mobile terminal device also after HO by forwarding the packet to the AR 22.

Non-Patent Document 1: D. Johnson, et al., "Mobility Support in IPv6," RFC3775, June 2004

Non-Patent Document 2: H. Soliman, et al, "Hierarchical Mobile IPv6 mobility management (HMIPv6)," draft-ietf-mipshop-hmipv6-04.txt, December 2004

In the above described HMIP, HO whose delay is shorter than in MIP is achieved by introducing an MAP. However, in HMIP, since route switching is performed by a mobile terminal device, the mobile terminal device has to recognize an address of an MAP. In addition, a signaling function for registering a position with an MAP is added to the function of MIP. Therefore, a mobile terminal device which has no function of HMIP cannot enjoy the effect of delay time reduction due to placing an MAP.

Thus, because HMIP is a scheme which expands the function of MIP, it is not only required that an MAP is added to a network, but also that a function is added to a mobile terminal device in such a manner that the mobile terminal device recognizes an address of the MAP, signaling is performed between the MAP and the mobile terminal device or the like. Therefore, a mobile terminal device which supports only MIP cannot perform the function of HMIP in a network where HMIP has been deployed.

Additionally, in HMIP, while movement is performed within a local network formed by an MAP, the same MAP is continually used. Therefore, it is concerned that a route becomes redundant if a mobile terminal device moves while continuing communication. To solve this, a technique for changing an MAP is also being examined. However, since this requires complicated control, the problem of reduction of HO processing capacity is caused by increase of the number of control message transmitted within wireless and wired zones and delay time associated with complexity of the control.

The present invention is made to solve the problems of the prior arts described above, and intended to provide an access router device, a mobility control system, and a mobility control method which can achieve movement between local networks formed by mobility control nodes without adding a function to the mobile terminal device.

DISCLOSURE OF THE INVENTION

An access router device according to an embodiment of the present invention is an access router device which reports network information that is used in common in a local network under a mobility control node to an area corresponding to the own device, characterized in that the access router comprises node identifying means for identifying a mobility control node corresponding to a local network of the mobile terminal device before the movement if the mobile terminal device moves into the area, network information reporting means for reporting, instead of the network information, network information used in the mobility control node identified by the node identifying means to the mobile terminal device, and current location notifying means for notifying the mobility control node corresponding to the local network of the mobile terminal device before the movement of an area corresponding to the own device as a current location of the mobile terminal device. This is a configuration for implementing processing of FIG. 5 described later, and, in a case of HO across mobility control nodes, reports network information before the movement (a network prefix, for example, "Prefix:B") instead of the network information to be originally reported (for example, "Prefix:A"). Thereby, the mobile terminal device determines that the movement is in the same network, and the mobile terminal device which continues communication without performing an address generation procedure can continue the communication without being aware of the HO across local networks.

In an embodiment, the access router device characterized in that it further comprises communication termination detecting means for detecting a communication termination of the mobile terminal device, wherein the network information reporting means reports network information to be originally notified to the mobile terminal device if the mobile termination detecting means detects the communication termination. Thereby, an appropriate mobility control node can be selected to change a subsequent communication route after the communication termination so that increase of delay time in packet forwarding can be prevented.

In an embodiment of the access router device according to the present invention the communication termination detecting means detects the communication termination by notification of communication termination from the mobile terminal device. Thereby, when the AR receives the notification of communication termination from the mobile terminal device, network information to be originally reported can be notified to the mobile terminal device and an address generation procedure can be started. Then, mobility control by a mobility control node corresponding to a local network before movement can be changed to mobility control by a mobility control node corresponding to a local network after the movement.

In an embodiment of the access router device according to the present invention the communication termination detecting means detects the communication termination by notification from the mobility control node. Thereby, when the AR cannot receive the notification of communication termination from the mobile terminal device, the network determines the communication termination, and a mobility control node for performing mobility control can be changed.

A mobility control system according to an embodiment of the present invention is characterized in that it comprises:

a mobility control node which controls sending and receiving of a packet to and from a mobile terminal device that is currently located in a local network composed of at least one area; and an access router device comprising node identifying means for identifying a mobility control node corresponding to a local network of the mobile terminal device before the movement if the mobile terminal device moves into the area, network information reporting means for reporting, instead of network information which is used in common in the local network and should be reported to an area corresponding to the own device, network information used in the mobility control node identified by the node identifying means to the mobile terminal device, and current location notifying means for notifying the mobility control node of the area corresponding to the own device as a current location of the mobile terminal device. The mobile terminal device can continue communication without being aware of HO.

In an embodiment of the mobility control system according to the present invention the mobility control system according to claim 5 characterized in that the notifying means notifies the mobility control node corresponding to the local network of the mobile terminal device before the movement. This is a configuration for implementing processing of FIG. 5 described later, in which the mobile terminal device can continue communication without being aware of HO across local networks.

In an embodiment of the mobility control system according to the present invention the notifying means notifies a destination mobility control node to which the mobile terminal device moves, and the mobility control node which receives the notification notifies the mobility control node corresponding to the local network of the mobile terminal device before the movement of the own node as a current location of the mobile terminal device. This is a configuration for implementing processing of FIG. 6 described later, and can reduce position registering time more than in the case of FIG. 5.

A mobility control method according to an embodiment of the present invention is a mobility control method which controls sending and receiving of a packet to and from a mobile terminal device that is currently located in a local network composed of at least one area, characterized in that the method comprises:

a node identifying step of identifying a mobility control node corresponding to a local network of the mobile terminal device before the movement if the mobile terminal device moves into the area, a network information reporting step of reporting network information used in the local network corresponding to the mobility control node identified by the node identifying step to the mobile terminal device, and a notifying step of notifying the mobility control node corresponding to the local network of the mobile terminal device before the movement of an access router device corresponding to the area as a current location of the mobile terminal device. This is a configuration for implementing processing of FIG. 5 described later, in which the mobile terminal device can continue communication without being aware of HO across local networks.

In an embodiment, the mobility control method controls sending and receiving of a packet to and from a mobile terminal device that is currently located in a local network composed of at least one area, characterized in that the method comprises:

a node identifying step of identifying a mobility control node corresponding to a local network of the mobile terminal device before the movement if the mobile terminal device moves into the area, a network information reporting step of reporting network information used in the local network corresponding to the mobility control node identified by the node identifying step to the mobile terminal device, a notifying step of notifying the mobility control node corresponding to a local network of a destination to which the mobile terminal device moves of an access router device corresponding to the area as a current location of the mobile terminal device, and a notifying step of notifying the mobility control node corresponding to the local network of the mobile terminal device before the movement of information about the mobility control node of the destination as a current location of the mobile terminal device. This is a configuration for implementing processing of FIG. 6 described later, and can reduce position registering time more than in the case of FIG. 5.

As described above, the present invention can achieve movement across local networks formed by mobility control nodes without adding a function to a mobile terminal device. In addition, by selecting an optimum mobility control node after the communication termination and performing a route change procedure, a route can be changed without regard to deterioration of communication quality. Thereby, when starting communication, the mobile terminal device can always start the communication using an optimum mobility control node.

BEST MODE FOR CARRYING OUT THE INVENTION

Hereinafter, embodiments of the present invention will be described with reference to the drawings. In each figure referred in the following description, a part equivalent with those of other figures is indicated by the same symbol.

(Network Configuration)

Figure 1:
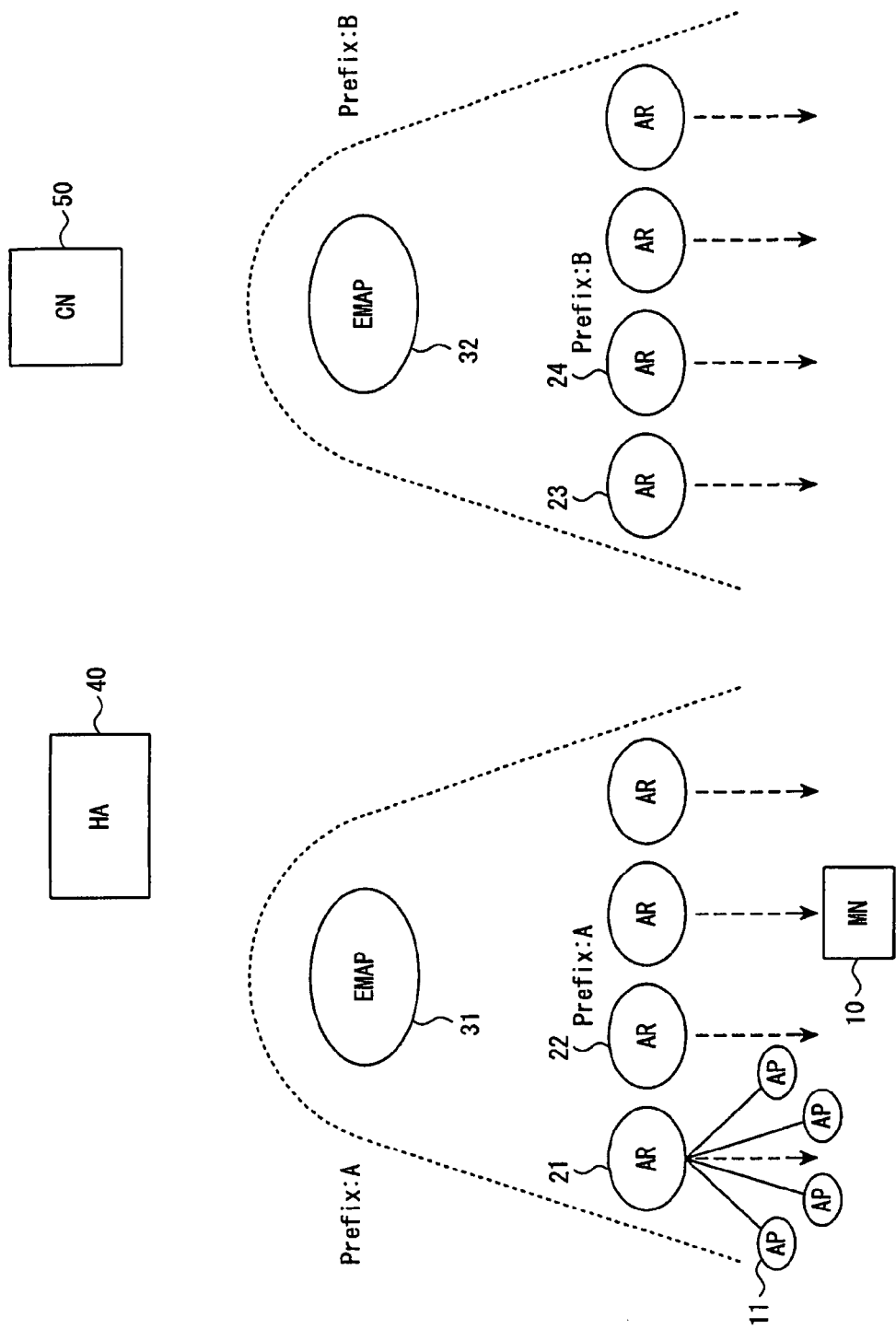
FIG. 1 is a diagram which shows a network configuration employing a mobility control system according to an embodiment of the present invention.

FIG. 1 is a diagram which shows a network configuration in the present invention. Description will hereinafter be made with reference to this figure.

The network shown in the figure comprises Edge Mobility Anchor Points (hereinafter referred to as EMAP) 31, 32 which become mobility control nodes, ARs 21 and 22 which are under the EMAP 31, ARs 23 and 24 which are under the EMAP 32, and a mobile terminal device (hereinafter abbreviated as MN) 10. A plurality of Access Points (hereinafter abbreviated as AP) 11, through which the MN 10 connects the network via radio, can be connected under the AR. With the above described configuration, local networks are implemented corresponding to the EMAP 31 and the EMAP 32 respectively (dashed line portions in the figure). Additionally, in an area provided corresponding to each AR, network information is reported. Specifically, "Prefix:A" is reported by the ARs 21 and 22 under the EMAP 31, and "Prefix:B" is reported by the ARs 23 and 24 under the EMAP 32. In a local network, only at least one AR is required to exist.

In the present example, a protocol for enabling a packet from a CN 50 to arrive at this network is MIP, and an HA 40 is provided. ARs under the same EMAP report common network information (prefix information is assumed in the present example) to the MN 10. Specifically, the ARs 21 and 22 under the EMAP 31 report "prefix:A" used in common in the network of the EMAP 31, and the ARs 23 and 24 under the EMAP 32 report "prefix:B" used in common in the network of the EMAP 32 respectively.

Therefore, when the MN 10 moves within local networks formed by the EMAP 31 and the EMAP 32 respectively, the MN 10 can communicate using single addresses. This network information is reported to the MN 10 based on request from the MN 10.

(Configuration Example of Access Router)

Figure 2:
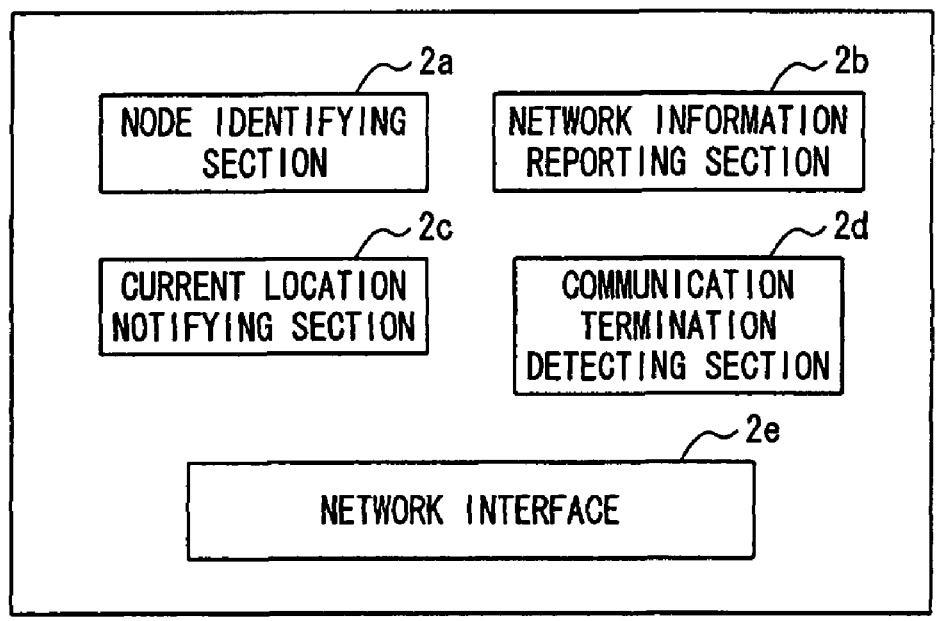
FIG. 2 is a functional block diagram which shows a configuration example of an access router in FIG. 1.

FIG. 2 is a functional block diagram which shows a configuration example of an access router in FIG. 1. In the figure, the access router comprises a node identifying section 2a which identifies a mobility control node corresponding to a local network of the mobile terminal device before the movement if the mobile terminal device moves into an area corresponding to the own device, a network information reporting section 2b which reports, instead of network information to be originally reported, network information used in the mobility control node identified by the node identifying section 2a to the mobile terminal device, a current location notifying section 2c for notifying the mobility control node corresponding to the local network of the mobile terminal device before the movement of an area corresponding to the own device as a current location of the mobile terminal device, a communication termination detecting section 2d which detects a communication termination of the mobile terminal device, and a network interface 2e for sending and receiving a packet to and from another device.

The node identifying section 2a identifies a mobility control node based on terminal identification information (for example, an IP address which uniquely identifies a terminal in a local network) from information notified to a network when the mobile terminal device moves.

(Movement in Local Network)

Figure 3:
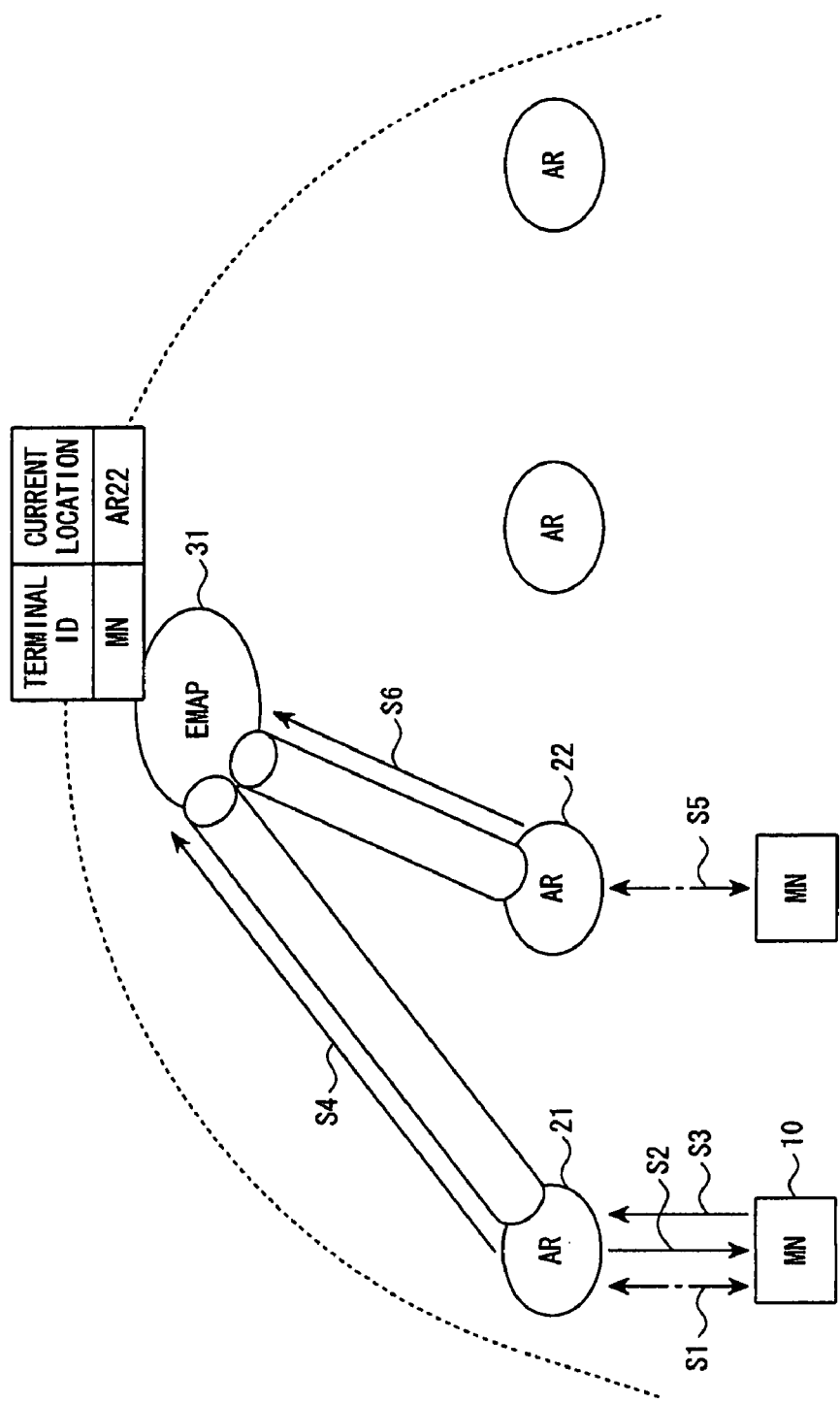
FIG. 3 is a diagram which shows operation during movement of a mobile terminal device in a local network.

FIG. 3 is a diagram which shows basic operation during movement in a local network. Hereinafter, description will be made with reference to this figure.

First, when the MN 10 connects at the start, the AR 21 determines an EMAP to be provided to the MN 10. When the MN 10 performs HO, the AR 22 uses a message or the like in processing during movement and connection performed by the MN 10 with respect to the network to acquire terminal identification information which can identify the MN 10. Then, the EMAP to be provided to the MN 10 is found using this terminal identification information as a key. Route changing can be allowed by signaling between the found EMAP and the AR to which the MN 10 connects.

The MN 10 starts communication by connecting to the AR 21 (step S1). The AR 21 reports prefix information required for generating an address to the MN 10 (step S2).

The MN 10 generates an address required for performing communication in a local network under the EMAP using the reported prefix (step S3).

When an address generated from the MN 10 is notified to the AR 21, the AR 21 generates a terminal identifier by which a mobile terminal device can be uniquely identified, and sends a Route update message along with the address of the MN 10 to notify the EMAP 31 that the MN 10 is connected to the AR 21 (step S4).

In this way, when the EMAP 31 receives a packet sent from a communication partner to the MN 10, the EMAP 31 forwards the packet by tunneling or the like toward the AR 21 in which the MN 10 is currently located. The AR 21 forwards the packet received from the EMAP to the MN 10.

A procedure where the MN 10 performs HO to the AR 22 will next be described.

The MN 10 performs HO processing to connect to the AR 22. The AR 22 extracts terminal identification information during this processing (step S5).

The AR 22 identifies the EMAP 31 being provided to the MN 10 based on the above described identification information and sends a route update message to the EMAP 31 to update current location information of MN 10 (step S6). Therefore, correspondence information between a terminal ID "MN" and a current location "AR 22" is registered in the EMAP 31.

By the foregoing procedures, mobility in the local network formed by the EMAP 31 can be provided without involving the MN 10. Therefore, the network can transparently provide mobility control to a terminal even if the terminal has no mobility control function.

(Case Across Local Networks)

Next, HO control across local networks formed by the EMAPs will be described based on the above described procedures.

Figure 4:
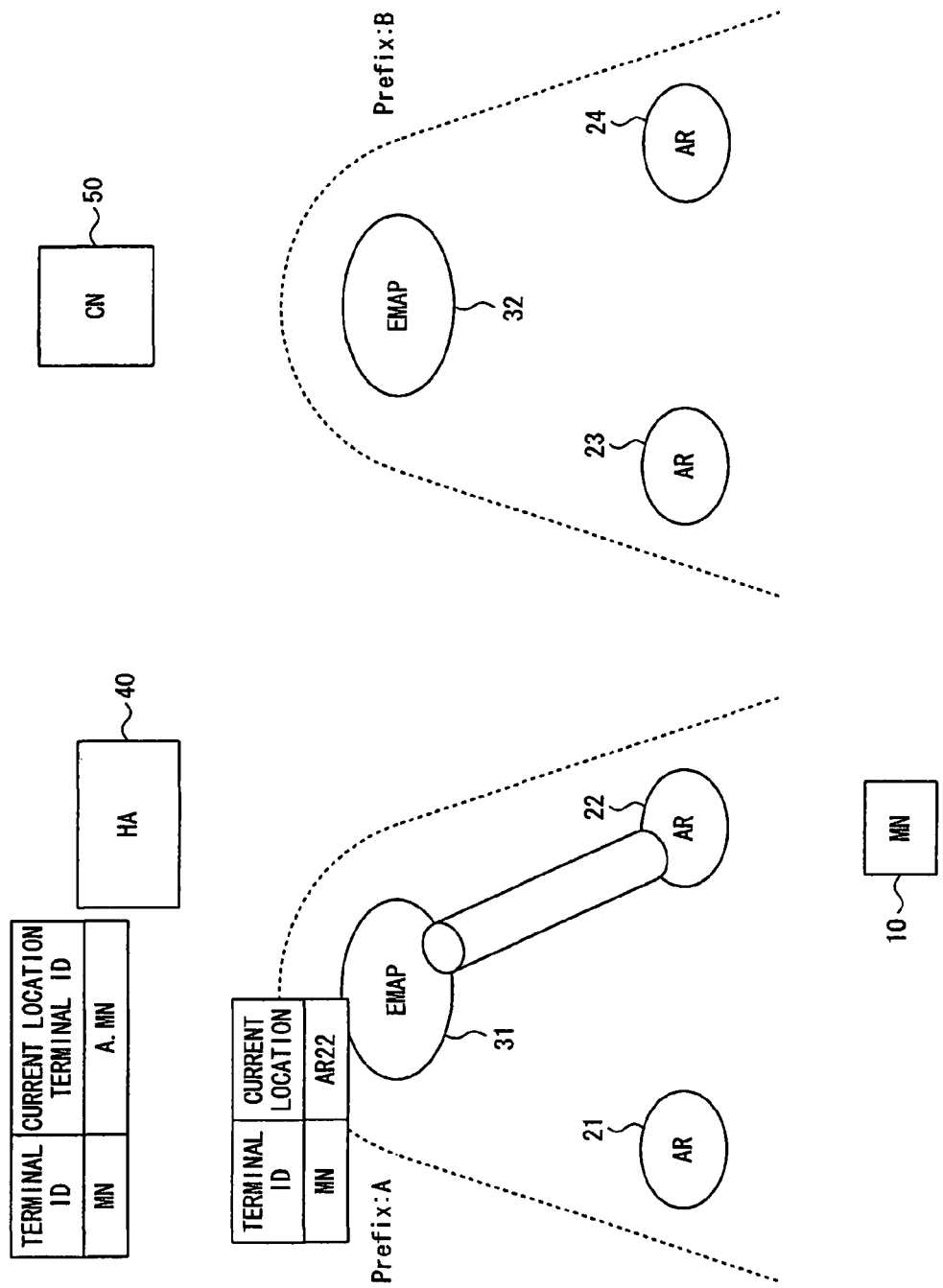
FIG. 4 is a diagram which shows an outline of operation of a network at the time when the mobile terminal device connects and communicates with another access router in the local network.

FIG. 4 is a diagram which shows a case where the MN 10 has connected to the AR 22 to start communication. Hereinafter, description will be made with reference to this figure.

Information which indicates that the MN 10 is currently located under the AR 22 has been registered in the EMAP 31.

MIP is assumed here as a protocol which allows forwarding between a CN and an EMAP, and an address by which the MN 10 can be identified under the EMAP 31 is registered in the HA 40. In the present example, "A. MN" that is a combination of "prefix:A" and a terminal identifier "MN" is defined as a current location terminal ID, and correspondence information between the terminal ID "MN" and the current location terminal ID "A. MN" is registered in the HA 40.

Thereby, a packet sent to the MN 10 by the CN 50 is once received by the HA 40 by deputy and then forwarded to the EMAP 31 referring to information held by the HA. The EMAP 31 forwards the packet to the AR 22 referring to current location information of the MN 10, and the AR 22 forwards the packet to the MN 10. By the procedure as described above, the packet sent from the CN 50 arrives at the MN 10.

Figure 5:
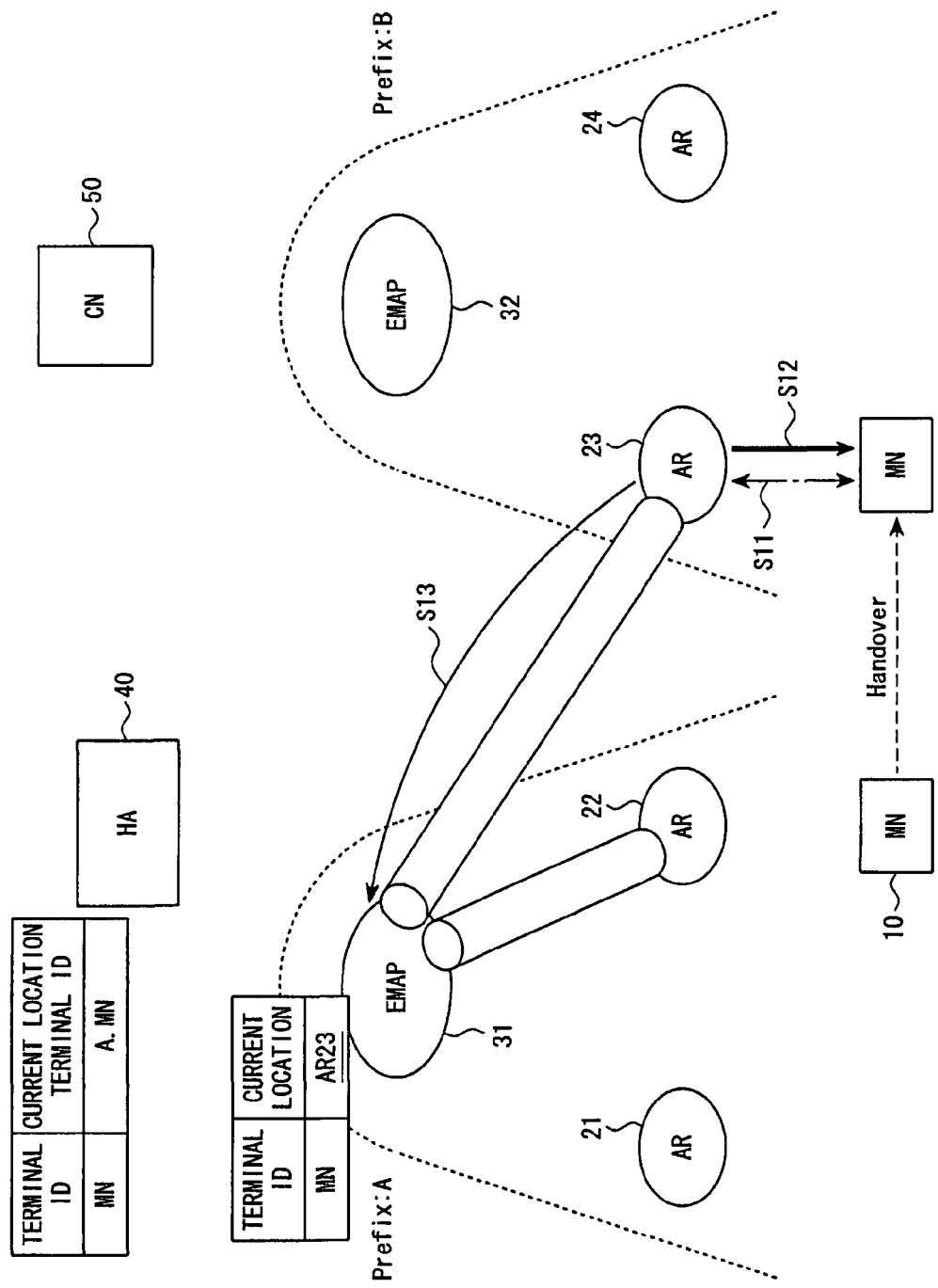
FIG. 5 is a diagram which shows one example of procedure for the mobile terminal device to perform handover across local networks.

FIG. 5 is a diagram which shows operation in which the MN 10 moves to AR 23 in the local network formed by the EMAP 32 while communication is being continued from the state of FIG. 4. Hereinafter, description will be made with reference to this figure.

The MN 10 performs handover processing to give notification of connection to the AR 23 (step S11).

The AR 23 extracts terminal identification information by which the MN 10 can be identified from the message being processed above, and identifies the EMAP 31. Because the EMAP 31 is a mobility control node in the local network of "prefix:A", the AR 23 reports "prefix:A" which can be used in the network of the EMAP 31, instead of "prefix:B" to be originally reported, to the MN 10 (step S12). The MN 10 which has received the report of "Prefix:A" determines that it is connected to a network under the EMAP 31 and does not generate a new address.

Then, the AR 23 sends a route update message to the EMAP 31 to change the current location of the MN 10 to the AR 23 (step S13). Therefore, correspondence information between the terminal ID "MN" and the current position "AR 23" is registered in the EMAP 31. From then on, a packet sent from the CN 50 will be forwarded sequentially through the EMAP 31 and the AR 23 to the MN 10.

Then, as shown in FIG. 1, the ARs 21, 22 in the network formed by the EMAP 31 reports "prefix:A" that is used in common with the EMAP 31. This may be reported periodically. The MN 10 is supposed to generate an address based on information (a report which indicates an MN as a destination address) reported directly from an AR.

When the MN 10 moves from the network formed by the EMAP 31 to the network formed by the EMAP 32, a prefix is changed since the AR 23 originally reports a "Prefix:B", and therefore an address having a new prefix is needed to be generated. However, in this case, there is a problem that registering of a position with the HA 40 in MIP occurs so that delay time increases. To deal with this, the AR 23 reports the "prefix:A" to the MN 10 as in the step S12.

Accordingly, even if HO across local networks occurs, the MN 10 can continue the communication without being aware of the HO across the local networks formed by the EMAPs. In other words, the MN 10 determines that the communication is continued in a local network under the same EMAP and does not have to perform an address generation procedure.

In addition, the AR 23 just has to update current location information of the MN 10 in the EMAP 31 by a similar procedure as in the case of movement in a local network under the same EMAP. Therefore, HO between local networks formed by EMAPs can be achieved without newly adding a function to the MN 10.

(Modification Example of the Case Across Local Networks)

An alternative procedure where the MN 10 moves from the AR 22 to the AR 23 in FIG. 5 will be described with reference to FIG. 6. In FIG. 5, since an AR in which the MN 10 is currently located is registered in the EMAP 31 before the movement, a forwarding route is set directly from the EMAP 31 to the current location AR. On the other hand, in FIG. 6, once forwarding from the EMAP before the movement to a destination EMAP is performed, forwarding to the current location AR is then performed. In this figure, processing from steps S11 to S12 is the same as those of FIG. 5. Processing from S23 is different from that of FIG. 5.

When the AR 23 identifies the EMAP, information of the AR 23 that is the current location is registered in the EMAP (EMAP 32) to which the AR 23 belongs. Thereby, correspondence information between the terminal ID "MN" and the current location "AR 23" is registered in the EMAP 32. In this route update message, information about the EMAP 31 which is the EMAP used before the HO is contained.

Upon receiving the above message, the EMAP 32 creates current location information of the MN 10. In addition, it also can recognize the information of the EMAP 31 that is the EMAP before the movement. Then, the EMAP 32 sends the route update message to the EMAP 31 (step S24) to register the own node as the current location. Thus, the current location information of the MN 10 in the EMAP 31 is changed to the EMAP 32, and the correspondence information between the terminal ID "MN" and the current location "EMAP 32" is registered in the EMAP 31. From then on, a packet sent from the CN 50 will arrive at the MN 10 through the EMAP 31, the EMAP 32, and the AR 23.

In the procedure described with reference to FIG. 6, a message amount in a local network is increased compared to the procedure in the case of FIG. 5. However, in the case of FIG. 5, when the MN 10 further moves to under the AR 24 while continuing communication, current location information must be registered even with the EMAP 31 to change a route.

Figure 6:
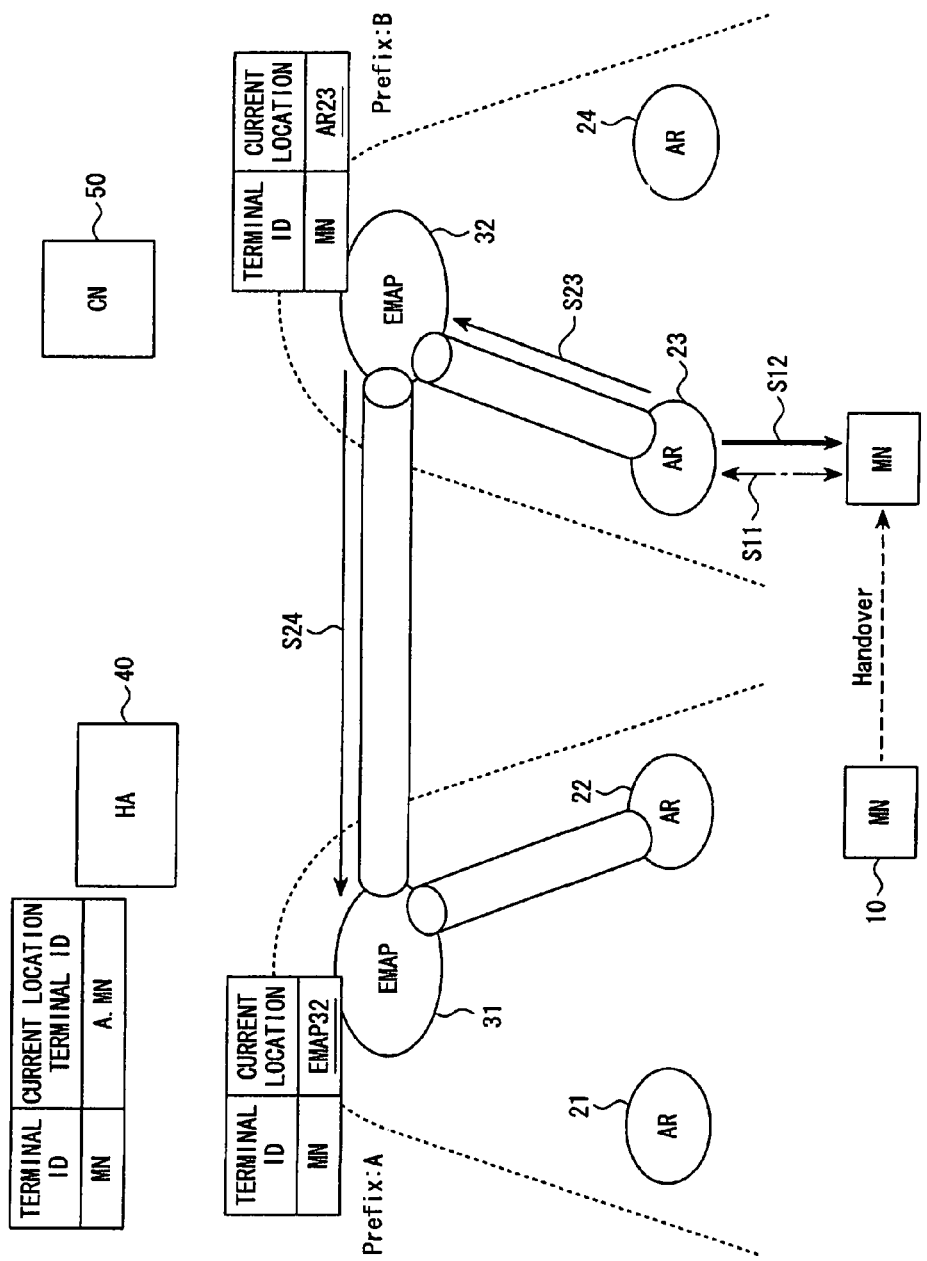
FIG. 6 is a diagram which shows another example of procedure for the mobile terminal device to perform handover across local networks.

On the other hand, in the case of FIG. 6, only the current location information needs to be registered in the EMAP 32. Therefore, in the case of FIG. 6, position registering time can be reduced compared to that in the case of FIG. 5.

Although, in the case of FIG. 6, current location information of the EMAP before the movement is updated through the destination EMAP 32, as an alternative technique, current location information of the destination EMAP 32 may be updated through the EMAP 31 before the movement.

In this way, HO across local networks formed by EMAPs can be achieved in either case of FIG. 5 or 6.

(Processing at Communication Termination)

Figure 7:
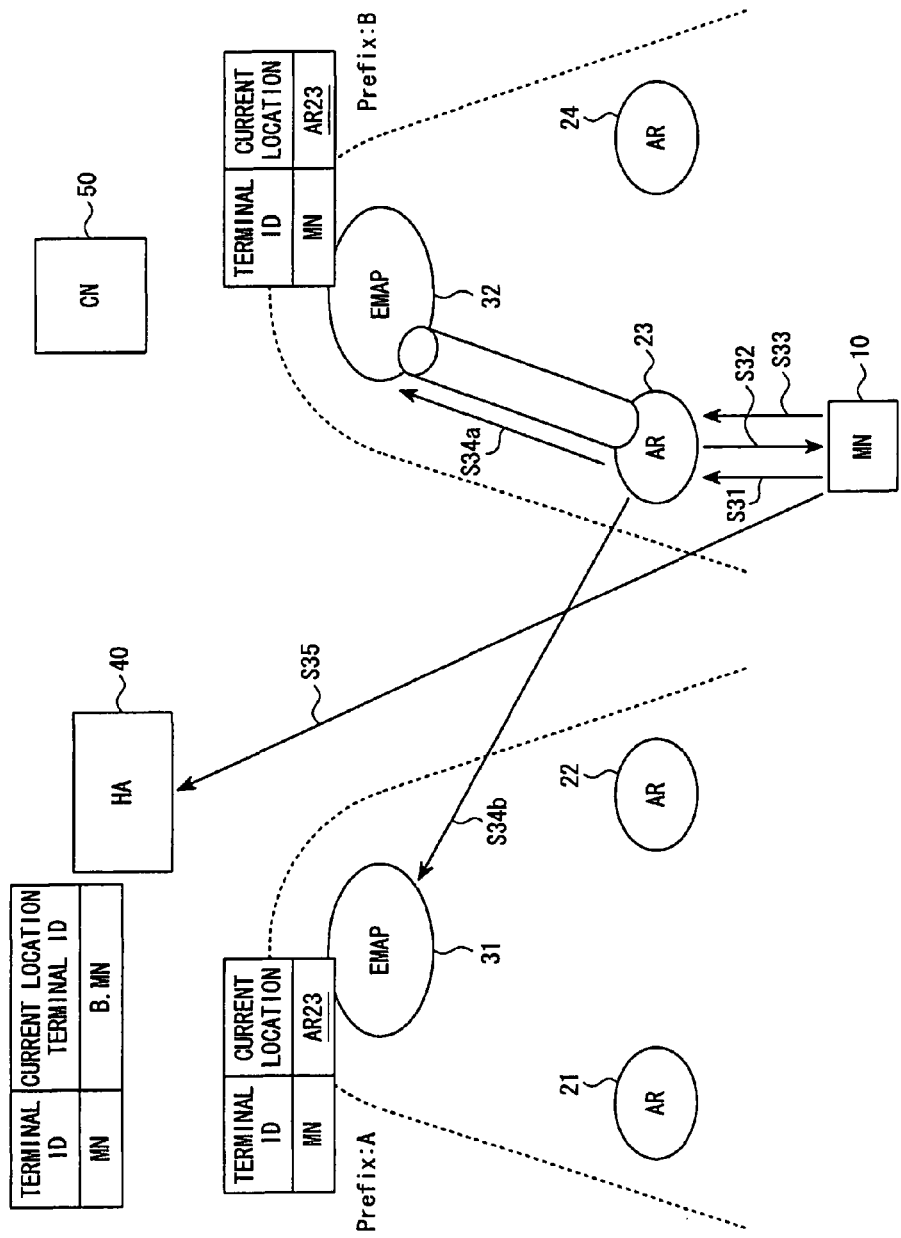
FIG. 7 is a diagram which shows one example of procedure from communication termination of the mobile control device to switching of EMAPs.

FIG. 7 is a diagram which shows a procedure for terminating communication while the MN 10 are connecting to the AR 23 some time after the MN 10 completes HO in the state of FIG. 5.

In FIGS. 5, 6, HO across local networks formed by EMAPs can be achieved by continually using an EMAP before movement. However, if the MN 10 continues to move, the distance between an EMAP before the movement and an AR of the current location increases, so that there is a problem that delay time in packet forwarding increases. Accordingly, procedure for selecting an optimum EMAP when terminating communication will be described.

First, the MN 10 notifies the AR 23 that the communication is terminated (step S31).

When the AR 23 detects that the MN 10 terminates the communication, the AR 23 sends a "prefix:B" that is a prefix to be originally reported to the MN 10 (step S32).

When the MN 10 receives a report of the above "prefix:B", the MN 10 determines that a network to be connected has changed since prefix information has changed from before, and generates an address for identifying the MN 10 in a new network and notifies the AR 23 of this address (step S33). In the present example, a "B.MN" that is a combination of the "prefix:B" and the mobile terminal identifier "MN" is generated for notification.

Upon receiving this, the AR 23 notifies the EMAP 32 of a route update message to register current location information of the MN 10 (step S34*a*). Thereby, correspondence information between the terminal ID "MN" and the current location "AR 23" is registered in the EMAP 32. Additionally, the AR 23 notifies the EMAP 31 of a route delete message to delete the current location information of the MN 10 registered in EMAP 31 before the movement (step S34*b*).

Furthermore, the MN 10 notifies the HA 40 of the generated address by a Binding update message of MIP (step S35). Thereby, correspondence information between the terminal ID "MN" and the current location terminal ID "B.MN" is registered in the HA 40.

From then on, a packet sent from the CN 50 to the MN 10 is forwarded sequentially through the HA 40, the EMAP 32, and the AR 23 to the MN 10.

By changing an EMAP after communication termination as described above, when the MN 10 starts the communication from then on, communication can always be started with an optimum route. In addition, since an EMAP is changed after communication termination, a route can be changed without regard to deterioration of quality in communication. In addition, since a procedure of MIP is used in a procedure for changing an address or the like, an EMAP can be changed without adding a function to the MN 10.

Although, the operation example described above, the MN 10 has a function for notification of communication termination, it may be determined that the MN 10 has already terminated communication using a packet counter function of an EMAP.

(Modification Example of Processing at Communication Termination)

Figure 8:
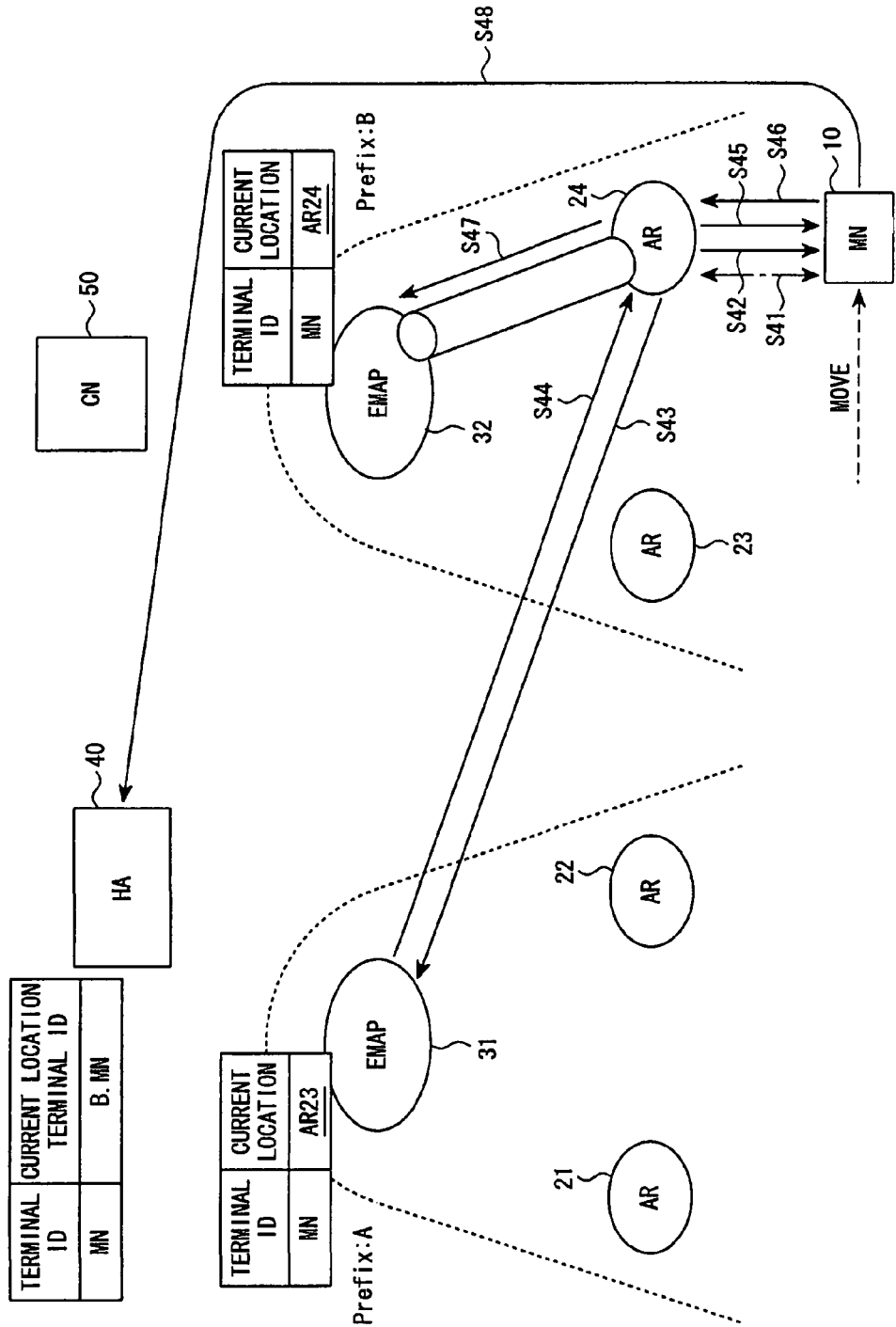
FIG. 8 is a diagram which shows another example of procedure from communication termination of the mobile control device to switching of EMAPs.
Figure 9:
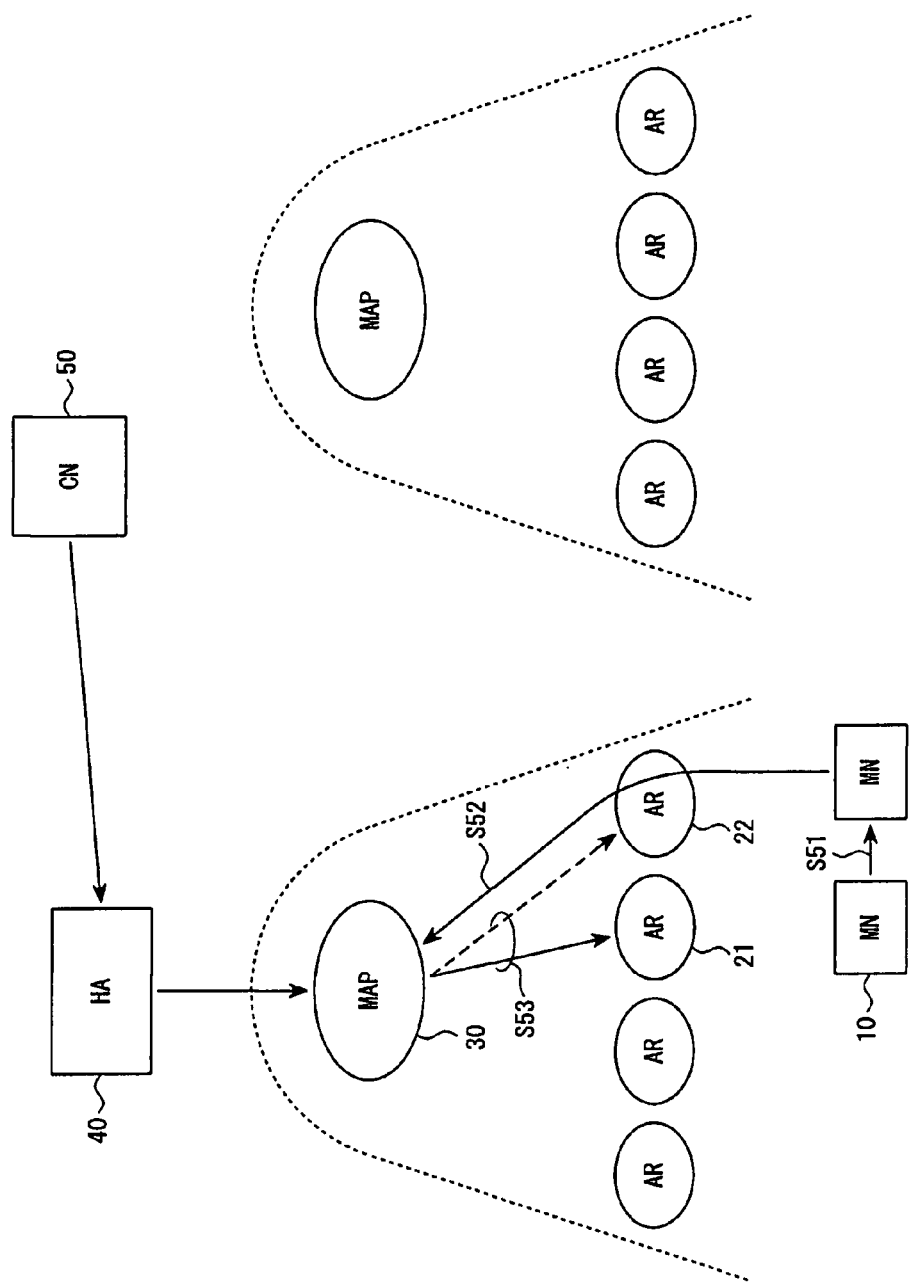
FIG. 9 is a diagram which shows an outline of HMIP.

FIG. 8 is a diagram which shows a modification example of the procedure of FIG. 7, where communication is terminated at the AR 23 and movement to the AR 24 is performed. In the present example, it is determined that the MN 10 has already terminated communication by a packet counter or a life-time function in an EMAP.

In FIG. 8, when the MN 10 moves to the AR 24, the MN 10 gives notification of connection (step S41).

The AR 24 extracts terminal identification information by which the MN 10 can be identified from the message being processed above, and identifies the EMAP 31. Because the EMAP 31 is a mobility control node in the local network of "prefix:A", the EMAP 31 reports "prefix:A" that can be used in the network of the EMAP 31, instead of "prefix:B" to be originally reported, to the MN 10 (step S42). The MN 10 which has received the report of "Prefix:A" determines that it is connected to a network under the EMAP 31 and does not generate a new address.

Then, the AR 24 sends a route update message to the EMAP 31 to change the current location of the MN 10 to the AR 24 (step S43). Thereby, correspondence information between the terminal ID "MN" and the current location "AR 24" is registered in the EMAP 31.

Upon receiving the route update message, the EMAP 31 checks a packet counter or a life-time for the MN 10 to determine that the MN 10 has terminated communication. The EMAP 31 thereby notifies the AR 24 that the MN 10 changes an address (step S44).

Upon receiving the notification from the EMAP 31, the AR 24 reports "prefix:B" to be originally reported to the MN 10 (step S45).

Upon receiving this report, the MN 10 determines that a network to be connected has changed, generates an address "B.MN" for identifying the MN 10 at a new network, and notifies the AR 24 of this address (step S46).

Then, the AR 24 determines the EMAP 32 as a mobility control node to be provided to the MN 10 based on the address notified by the MN 10, and sends a Route update message to register packet forwarding information (step S47).

Further, the MN 10 registers an address for identifying the MN 10 under the EMAP 32 with the HA 40 (step S48). Thereby, the next packet sent from the CN 50 to the MN 10 is forwarded through the HA 40 to the EMAP 32, and further forwarded through the AR 24 to the MN 10.

At this point, in the case of FIG. 7, a route can be changed by explicitly giving notification of communication termination from the MN 10. However, if a radio system is used between AR and MN, and the MN 10 is currently located on a border of a range in which a radio wave can reach from a network (a group of AP) formed by the AR 23, it may be assumed that the MN 10 moves before a procedure for generating an address used in a network formed by a new EMAP (a destination EMAP) completes.

In this case, the network determine that the MN 10 terminates communication according to the procedure of FIG. 8, and thus the address generation procedure can be started. In such a process, only the network judges that the MN 10 terminates communication, and a procedure after the communication is in accordance with a regular procedure for generating an IP address. Thus, there is an advantage that a new function is not required to be added to the MN 10 on the occasion of communication termination.

(Other Modification Examples)

Although MIP is given as an example of a packet transfer protocol from the CN 50 to an EMAP in the foregoing description, the scheme thereof is not limited to MIP and can be applied to various protocols which enable mobility on an IP network.

In addition, although the foregoing description is based on the address generation procedure of IPv6 stateless, the present invention can also be applied to an address generation procedure of stateful using DHCP or the like. Specifically, in DHCP, a confirm message is sent to a network to confirm validity of an address when the MN 10 moves. With this response, the MN 10 determines that the same address can be continually used even after the movement.

Then, when the MN 10 moves across local networks, the MN 10 sends a confirm message to an AR. Upon receiving this, the AR extracts a terminal identifier from the message, and determines that the MN 10 has moved from a local network formed by an EMAP that is different from an EMAP to which the AR belongs. Then, the AR sends a DHCP reply to the MN 10 and notifies it that the address is continuously valid so as to make the MN 10 not aware of HO across the local networks.

Therefore, just with the destination AR sending the route update message to the old EMAP (the EMAP before the movement), the MN 10 can continue communication without starting address generation procedure. Then, it is only necessary to perform address generation according to the DHCP's procedure after the communication is terminated as the above stateless address generation procedure.

(Mobility Control Method)

In the mobility control system described above, the following control methods are provided.

In the processing of FIG. 5, there is provided a mobility control method which controls sending and receiving of a packet to and from a mobile terminal device that is currently located in a local network composed of at least one area, the method comprising a node identifying step of identifying a mobility control node corresponding to a local network of the mobile terminal device before the movement if the mobile terminal device moves into the area (see step S11 in FIG. 5), a network information reporting step of reporting network information used in the local network corresponding to the mobility control node identified by the node identifying step to the mobile terminal device (see step S12 in FIG. 5), and a notifying step of notifying the mobility control node corresponding to the local network of the mobile terminal device before the movement of an access router device corresponding to the area as a current location of the mobile terminal device (see step S13 in FIG. 5). According to this mobility control method, the mobile terminal device can continue communication without being aware of HO across local networks.

In the processing of FIG. 6, there is provided a mobility control method which controls sending and receiving of a packet to and from a mobile terminal device that is currently located in a local network composed of at least one area, the method comprising a node identifying step of identifying a mobility control node corresponding to a local network of the mobile terminal device before the movement if a mobile terminal device moves into the area (see step S11 in FIG. 6), a network information reporting step of reporting network information used in the local network corresponding to the mobility control node identified by the node identifying step to the mobile terminal device (see step S12 in FIG. 6), a notifying step of notifying the mobility control node corresponding to a local network of a destination to which the mobile terminal device moves of an access router device corresponding to the area as a current location of the mobile terminal device (see step S23 in FIG. 6), and a notifying step of notifying the mobility control node corresponding to the local network of the mobile terminal device before the movement of information about the mobility control node of the destination as a current location of the mobile terminal device (see step S24 in FIG. 6). According to this mobility control method, position registering time can be reduced compared to that in the case of FIG. 5.

Conclusion

In the present invention, a mobility control node is placed in the network as in HMIP, a packet is forwarded from a communication partner to the mobility control node by a basic IP mobility protocol such as MIP supporting movement in a local network managed by the mobility control node. Furthermore, in the present invention, if the mobile terminal device moves in the local network, a trigger which indicates that handover has been performed is notified to the network, and a mobility control node being provided to the mobile terminal device is identified by the trigger, so that mobility of the mobile terminal device is achieved. In other words, mobility control is achieved without the need for the mobility terminal device to send a message directly to the mobility control node. In addition, while the mobile terminal device moves within an area managed by the mobility control node, the mobile terminal device continues the communication using the same address as before the movement.

By managing a communication state of a terminal in a network, when the terminal determines that the communication is terminated, a mobility control node to be provided to the terminal is reset to an optimum mobility control node in a local network to which the terminal currently connects. If the terminal already has a function for notifying the network of the communication state by a mechanism other than the mobility control on the terminal, notification of communication termination from the mobile terminal device may be a trigger.

INDUSTRIAL APPLICABILITY

The present invention can be used for achieving mobility control in which a mobile terminal device uses the same identifier during movement between local networks without the need of an additional function for receiving a mobility control service such as a function to identify a mobility control mode in a local network, thereby allowing delay time associated with HO processing to be reduced.

The invention claimed is:

1. An access router device which reports network information that is used in common in local networks the access router device comprising:
   a node identifying section for identifying a first mobility control node corresponding to a first local network before a mobile terminal device moves into a second local network;
   a network information reporting section for reporting to the mobile terminal device first network information about the first local network identified by the node identifying section, instead of second network information about the second local network after the mobile terminal node moves;
   a current location notifying section for notifying the first mobility control node corresponding to the first local network of the second local network as a current location of the mobile terminal device; and
   a communication termination detecting section for detecting communication termination of the mobile terminal device;
   wherein the communication termination detecting section detects the communication termination by notification from the first mobility control node corresponding to the first local network;
   and wherein the network information reporting section reports to the mobile terminal device the second network information about the second local network after the mobile terminal device moves, when the communication termination detecting section detects the communication termination.

2. The access router device according to claim 1, wherein the communication termination detecting section detects the communication termination by the notification of the communication termination from the mobile terminal device.

3. A mobility control system, comprising:
   a mobility control node which controls sending and receiving of a packet to and from a mobile terminal device that is currently located in a local network composed of at least one area; and
   an access router device that comprises:
   a node identifying section for identifying a first mobility control node corresponding to a first local network before the mobile terminal device moves into a second local network;
   a network information reporting section for reporting to the mobile terminal device first network information about the first local network identified by the node identifying section, instead of second network information about the second local network after the mobile terminal node moves;

a current location notifying section for notifying the first mobility control node corresponding to the first local network of the second local network as a current location of the mobile terminal device; and a communication termination detecting section for detecting communication termination of the mobile terminal device;

wherein the communication termination detecting section detects the communication termination by notification from the first mobility control node corresponding to the first local network;

and wherein the network information reporting section reports to the mobile terminal device the second network information about the second local network after the mobile terminal device moves, when the communication termination detecting section detects the communication termination.

4. The mobility control system according to claim 3, wherein the current location notifying section notifies the first mobility control node corresponding to the first local network.

5. The mobility control system according to claim 3, wherein the current location notifying section notifies a second mobility control node corresponding to the second local network after the mobile terminal device moves of the current location of the mobile terminal device and wherein the second mobility control node which is notified of the current location of the mobile terminal device notifies the first mobility control node corresponding to the first local network as the current location of the mobile terminal device.

6. A mobility control method which controls sending and receiving of a packet to and from a mobile terminal device that is currently located in a local network composed of at least one area, the method comprising:

identifying a first mobility control node corresponding to a first local network of a mobile terminal device before the mobile terminal device moves into a second local network;

reporting to the mobile terminal device first network information about the first local network identified in the identifying;

notifying the first mobility control node corresponding to the first local network of the second local network as a current location of the mobile terminal device; and detecting communication termination of the mobile terminal device;

wherein in the detecting the communication termination is detected by notification from the first mobility control node corresponding to the first local network;

and wherein in the reporting the second network information about the second local network after the mobile terminal device moves is reported to the mobile terminal device, when the communication termination is detected.

7. A mobility control method which controls sending and receiving of a packet to and from a mobile terminal device that is currently located in a local network composed of at least one area, the method comprising:

identifying a first mobility control node corresponding to a first local network of a mobile terminal device before the mobile terminal device moves into a second local network;

reporting to the mobile terminal device first network information about the first local network identified in the identifying;

a second mobility control node corresponding to the second local network after the mobile terminal device moves of an access router device corresponding to the second local network as a current location of the mobile terminal device;

notifying the first mobility control node corresponding to the first local network of the second local network as a current location of the mobile terminal device; and detecting communication termination of the mobile terminal device;

wherein in the detecting the communication termination is detected by notification from the first mobility control node corresponding to the first local network;

and wherein in the reporting the second network information about the second local network after the mobile terminal device moves is reported to the mobile terminal device, when the communication termination is detected.

* * * * *